(No Model.)

F. GAUTIER.
PLOW.

No. 254,952. Patented Mar. 14, 1882.

WITNESSES:
Fred. G. Dieterich
A. G. Syne

INVENTOR:
F. Gautier
BY
ATTORNEYS.

UNITED STATES PATENT OFFICE.

FERNANDO GAUTIER, OF PASCAGOULA, MISSISSIPPI.

PLOW.

SPECIFICATION forming part of Letters Patent No. 254,952, dated March 14, 1882.

Application filed January 13, 1882. (No model.)

*To all whom it may concern:*

Be it known that I, FERNANDO GAUTIER, of Pascagoula, in the county of Jackson and State of Mississippi, have invented a new and useful Improvement in Plows, of which the following is a full, clear, and exact description, reference being had to the annexed drawings, forming part of this specification.

This invention relates to plows having cutters to prevent choking from weeds and stalks; and the invention consists of certain novel features of construction relating to various parts of the plow, as will be hereinafter described.

Figure 1:
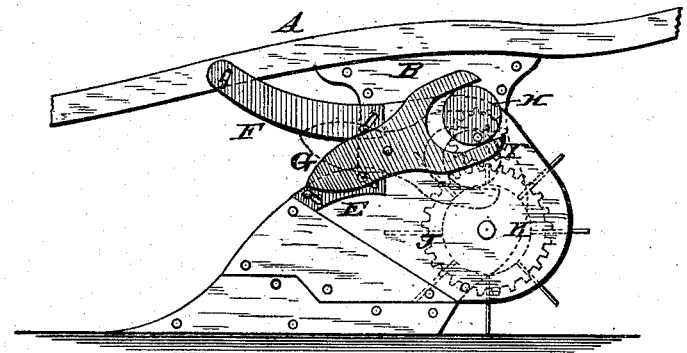
Figure 2:
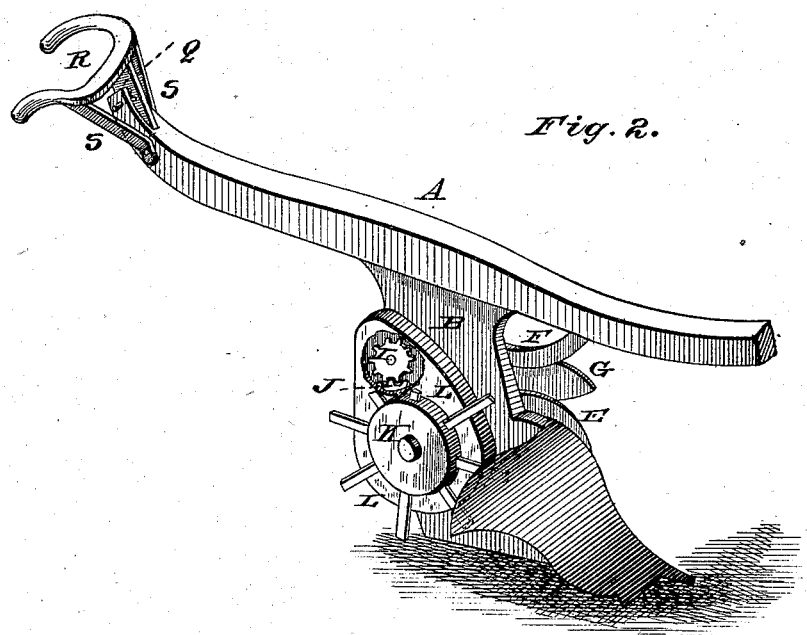
Figure 3:
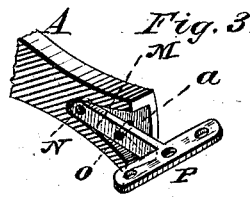

In the accompanying drawings, Figure 1 is a side elevation of my improved plow, showing the cutters. Fig. 3 is a perspective showing the mechanism for operating the cutters, and Fig. 3 is a detail of the beam and clevis.

In Letters Patent No. 218,253, granted to me August 5, 1879, I have shown and described a plow having an oscillating cutter, which is operated by an eccentric and suitable gearing connected therewith, and two stationary cutters arranged respectively above and below the oscillating cutter. In the said invention the stationary cutters are so arranged with respect to each other that the whole of their cutting edge, as well as that of the oscillating cutter, shall be made available in the operation of the device—that is to say, the stationary cutters are arranged with their rear ends at a given distance apart, and their forward ends curved from each other in such manner that the oscillating cutter, which is pivoted at a point to the rear of the intervening space, shall cut against the stationary cutters from the rear ends of their exposed edges to its extreme forward end. I have found in practice, however, that the necessary grinding of the cutters gradually disarranges their relative position, and that it is necessary to adjust the stationary cutters nearer to each other in order to take up wear. I therefore construct the cutters E and F in separate removable pieces and provide them with slots near their ends, through which bolts are passed to secure them adjustably in position. With this construction, as the edges are worn away the cutters are to be moved toward each other, so that the whole of their exposed cutting-surface, as well as that of the stationary cutter, shall be utilized.

The oscillating cutter G is connected to an eccentric, H, at its rear end, which is operated by means of the gear-wheels I and J and the driving-wheel K, arranged on the opposite side of the standard B, as in my former invention. The gear-wheels are inclosed in a suitable case or box, L, secured to the standard, to prevent accidental clogging with soil.

As it is designed that the beam A shall be made of cast-steel or other metal, I construct its forward end with an enlargement containing a vertically-flaring recess, a, of sufficient depth to receive a short T-shaped clevis, M, which is pivoted in the bottom of the recess by a bolt, N, and adjusted in a raised or lowered position by a second bolt, O, which is passed through one of a series of perforations in the beam and a perforation in the clevis. The outer end of the clevis is provided with a horizontal projection, P, having a series of perforations for the lateral adjustment of the line of draft.

I am aware that a chambered plow-beam is not broadly new; but heretofore the recess has been carried through the upper surface of the beam to allow sufficient vertical adjustment of the clevis. This construction, however, does not secure as great strength to the beam and its connection with the clevis as where the clevis is entirely surrounded by the walls of the recess. In my invention the recess is formed solely in the end of the beam, and as the said end is made enlarged or flaring in a vertical plane, the recess is made sufficiently long to allow all necessary adjustment of the clevis without weakening the beam in a corresponding degree. Another advantage of this peculiarly-chambered beam is that it may be constructed of wood and re-enforced with iron bands without interfering with the adjustment of the clevis, whereas in the usual form of chambered beam the bands would limit the action of the clevis in a vertical plane.

The clevis M consists simply of a T-shaped bar of iron. It therefore requires but little material in its construction, and can be made in a shorter time than any other clevis of which I am aware.

The handles of the plow consist of the curved bar R, secured to a standard, Q, which is pivoted in a deep longitudinal recess in the upward curved rear end of the beam A, and by means of a bolt and a suitable series of perforations adapted to be adjusted to a higher or lower position, as the height of the plowman may require.

Adjustable handles have been so constructed as to slide along the beam; but this causes the rear end of the beam to project against the plowman when the handles are adjusted to a low position. Again, handles have been made adjustable at a point so far forward of the plowman that the adjustment could not be accomplished without passing around to the side of the plow. It will be observed, however, that my adjustable plow-handles may be adjusted by the plowman without leaving his position behind the plow and without any inconvenience from the resulting position of the beam.

The handles R may be provided with lateral braces S, secured to the beam by a single bolt.

Having thus described my invention, what I claim as new, and desire to secure by Letters Patent, is—

1. In a plow, the combination, with the oscillating cutter G, of the stationary adjustable cutters E and F, substantially as shown and described, whereby the stationary cutters may be adjusted toward each other to take up wear and utilize the whole of their cutting-edge, as set forth.

2. In a plow, the beam A, having its forward end enlarged and provided with a vertically-flaring recess, in combination with the T-shaped clevis M, having a horizontal projection, P, substantially as shown and described, and for the purpose set forth.

3. In a plow, the combination of the beam A, having a deep longitudinal recess in its rear end, and the handles R, having standard Q, pivoted in said recess and adapted for adjustment to a higher or lower position, substantially as shown and described, and for the purpose set forth.

FERNANDO GAUTIER.

Witnesses:
W. M. CANTY,
THOS. R. JEFFERY.